United States Patent
Talley et al.

(10) Patent No.: US 9,253,595 B1
(45) Date of Patent: Feb. 2, 2016

(54) DETERMINATION OF BASE STATION LOCATION BASED ON OTHER SERVING LOCATIONS AVAILABLE TO CLIENT DEVICES

(71) Applicant: Sprint Spectrum L.P., Overland Park, KS (US)

(72) Inventors: Ryan S. Talley, Overland Park, KS (US); Kyle C. Allen, Overland Park, KS (US); Nicolas A. Nehme Antoun, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 22 days.

(21) Appl. No.: 14/168,275

(22) Filed: Jan. 30, 2014

(51) Int. Cl.
H04W 72/00 (2009.01)
H04W 24/00 (2009.01)
H04W 4/02 (2009.01)

(52) U.S. Cl.
CPC ........................................ H04W 4/02 (2013.01)

(58) Field of Classification Search
CPC ..................... G01S 19/00–19/53; H04W 4/02; H04W 64/00–64/006
USPC ........... 340/8.1; 342/357.2–357.64, 450, 451, 342/453, 457; 455/404.2, 440, 456.1–457
See application file for complete search history.

(56) References Cited

U.S. PATENT DOCUMENTS

| | | | | |
|---|---|---|---|---|
| 7,577,443 | B1 * | 8/2009 | Moll et al. | 455/456.1 |
| 8,750,894 | B1 * | 6/2014 | Stogaitis et al. | 455/456.1 |
| 9,071,935 | B2 * | 6/2015 | Venkatraman | |
| 2002/0001339 | A1 * | 1/2002 | Dooley et al. | 375/150 |
| 2002/0115448 | A1 * | 8/2002 | Amerga et al. | 455/456 |
| 2002/0149515 | A1 * | 10/2002 | Alanen et al. | 342/357.1 |
| 2003/0220116 | A1 * | 11/2003 | Sagefalk et al. | 455/456.1 |
| 2005/0037775 | A1 * | 2/2005 | Moeglein et al. | 455/456.1 |
| 2006/0095348 | A1 * | 5/2006 | Jones et al. | 705/29 |
| 2007/0002813 | A1 * | 1/2007 | Tenny et al. | 370/338 |
| 2008/0096581 | A1 * | 4/2008 | Do et al. | 455/456.2 |
| 2008/0267114 | A1 * | 10/2008 | Mukherjee et al. | 370/315 |
| 2010/0067482 | A1 * | 3/2010 | Vikberg et al. | 370/331 |
| 2011/0034179 | A1 * | 2/2011 | David et al. | 455/456.1 |
| 2012/0129461 | A1 * | 5/2012 | Venkatraman | 455/67.11 |
| 2013/0268232 | A1 * | 10/2013 | Poduri et al. | 702/150 |
| 2013/0268654 | A1 * | 10/2013 | Abraham et al. | 709/224 |
| 2015/0029879 | A1 * | 1/2015 | Chou et al. | 370/252 |
| 2015/0043362 | A1 * | 2/2015 | Sankar et al. | 370/252 |

* cited by examiner

Primary Examiner — Rafael Pérez-Gutiérrez
Assistant Examiner — Mark G. Pannell

(57) ABSTRACT

A system and method for determining base station location from neighbor lists of client devices is disclosed. When base station attempts and fails to acquire a satellite-based location fix, it can identify client devices operating within its service range, and query them for their respective neighbor lists. Upon receiving neighbor lists from one or more of the queried client devices, the base station can merge the lists into a composite list. The base station can then determine the locations of the base stations in the composite list, and compute a centroid from the locations. The base station can then adopt the centroid location as its own location.

20 Claims, 6 Drawing Sheets

DETERMINATION OF BASE STATION LOCATION BASED ON OTHER SERVING LOCATIONS AVAILABLE TO CLIENT DEVICES

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according IS-2000 and IS-856 standards, for example, the antenna system is referred to as a base transceiver system (BTS), and is usually under the control of a base station controller (BSC). In a universal mobile telecommunications system (UMTS) configured to operate according to ITU IMT-2000 standards, the antenna system is usually referred to as a NodeB, and is usually under the control of a radio network controller (RNC). Other architectures and operational configurations of a RAN are possible as well.

A subscriber (or user) in a service provider's wireless communication system accesses the system for communication services via a Wireless Communication Device ("WCD"), such as a cellular telephone, "smart" phone, pager, or appropriately equipped portable computer, for instance. In a CDMA system a WCD is referred to as an access terminal ("AT"); in a UMTS system a WCD is referred to as User Equipment ("UE"). For purposes of the discussion herein, the term WCD will generally be used to refer to either an AT or UE or the like. When a WCD is positioned in a cell, it communicates via an RF air interface with the BTS or NodeB antenna of the cell. Consequently, a communication path or "channel" is established between the WCD and the transport network, via the air interface, the BTS or NodeB, the BSC or RNC, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or NodeB, or by respective antennas. These sectors can be referred to as "physical sectors," since they are physical areas of a cell site. Therefore, at any given instant, a WCD in a wireless network will typically be positioned in a given physical sector and will be able to communicate with the transport network via the BTS or NodeB serving that physical sector.

The functional combination of a BTS of a cell or sector with a BSC, or of a NodeB and an RNC, is commonly referred to as a "base station." The actual physical of a configuration of a base station can range from an integrated BTS-BSC or NodeB-RNC unit to a distributed deployment of multiple BTSs under a single BSC, or multiple NodeBs under a single RNC. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time. On this scale, coverage is referred to as "macro-network coverage" and the base station is referred to as a "macro-type base station."

More recently, a type of base-station functional unit aimed at coverage over a much smaller physical area and at concurrent support of many fewer subscribers has been introduced. Referred to generically herein as a "micro-type base station," this device can be used to fill in local coverage gaps in macro-network coverage (e.g., in buildings), or to provide localize, small-area coverage where no macro-network coverage exists. When deployed as an integral component of a RAN, a micro-type base station is also referred to as a "picocell."

Service providers have also begun offering even smaller micro-type base stations as consumer devices, under the technical moniker of "femtocells." Comparable in size to desktop phone, femtocells can similarly fill in gaps in macro-network coverage (e.g., in buildings), while providing limited and exclusive coverage to individual subscribers within residential (or other small-scale) spaces. Instead of connecting as an integral component of the RAN to an MSC, PDSN, or other network switch, a femtocell communicates with the service provider's network via one or another form of broadband connection associated with or available to the consumer-owner (or renter) of the femtocell, for example from an internet service provider (ISP).

A subscriber may move between neighboring coverage areas of macro-type base stations and micro-type base stations, and even between neighboring coverage areas of different micro-type base stations, in the same way the subscriber moves between neighboring macro coverage areas. More specifically, as a subscriber at a WCD moves between wireless coverage areas of a wireless communication system, such as between cells or sectors, or when network conditions change or for other reasons, the WCD may "hand off" from operating in one coverage area to operating in another coverage area. In a usual case, this handoff process is triggered by the WCD monitoring the signal strength of various nearby available coverage areas, and the BSC or RNC (or other controlling network entity) determining when one or more threshold criteria are met. For instance, a WCD may continuously monitor signal strength from various available sectors and notify a BSC when a given sector has a signal strength that is sufficiently higher than the sector in which the WCD is currently operating. The BSC may then direct the WCD to hand off to that other sector. By convention, a WCD is said to handoff from a "source" cell or sector (or base station) to a "target" cell or sector (or base station).

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as 1X Radio Transmission Technology ("1X-RTT") communications, also abbreviated as just "1x." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as Evolution-Data Optimized ("EVDO") communications, also abbreviated as just "DO." A carrier could also implement an orthogonal frequency division multiple access (OFDMA) based system according to protocols specified by third generation partnership project (3GPP) Long Term Evolution ("LTE") Advanced, for example. WCDs may be capable of communication under any or all such protocols, and may further be capable of handing off between them, in addition to being able to hand off between various configurations of coverage areas.

Overview

A micro-type base station can be a low-power, low-capacity version of a macro-type base station, typically plugging into a residential power outlet, perhaps with a transformer providing a DC power supply. The micro-type base station may have a wired or wireless connection with the user's router, and would thus have connectivity to the Internet and/or one or more other packet-data networks via the user's broadband connection. A micro-type base station may establish a virtual private network (VPN) connection over the Internet with an entity (e.g., a VPN terminator) on the wireless-service (macro network) provider's core network, and thereby be able to securely communicate with the VPN terminator and other entities on that core network and beyond.

The small form factor of a micro-type base station makes it deployable in a portable fashion. As such, it may not be as reliably fixed to a particular geographic location as a macro-type base station, which is typically deployed as part of a network's infrastructure. In order to determine its geographic location, a micro-type base station can be equipped with a satellite-based positioning system (SPS) receiver (e.g., a Global Positioning System (GPS) receiver) for use in receiving and decoding SPS signals. Timing signals embedded in SPS signals can also be used for synchronizing operations with other micro-type base stations and with the macro network. A micro-type base station can also have comprehensive auto-configuration capabilities, making it largely a "plug-and-play" device to the user.

When a micro-type base station is powered on, or in response to some other command or triggering event, it can use its SPS receiver to attempt to obtain an initial SPS fix, which typically involves receiving signals from multiple (e.g., three or four) satellites and using those signals to compute its location. Location determination may also include the assistance of a network entity such as a position determining entity (PDE). For instance, the micro-type base station may use its Internet connection to send the data that it receives from the multiple SPS satellites to the PDE, and the PDE may then do the necessary calculations and return a location (e.g., latitude and longitude) to the micro-type base station.

In instances in which the micro-type base station computes or receives an indication of its own location, the micro-type base station may then—as part of an auto-configuration process, for example—use that location to receive authorization to operate in a given location and acquire one or more operating parameters, such as a traffic-bearing carrier frequency (i.e., a carrier), and/or an identifying code, among others. In one example, the micro-type base station may send a request for configuration information to a network entity, such as a micro-type base station controller, where the request includes the micro-type base station's location, perhaps among other values. The micro-type base station controller may then use that location to determine whether the micro-type base station is authorized to operate in the location. If the micro-type base station is authorized to operate in the location, the micro-type base station controller may identify which carriers are licensed by the service provider in the location in which the micro-type base station resides. The micro-type base station controller may then choose a licensed carrier, an identifying code, and/or other configuration parameters, and send a configuration response to the micro-type base station over the Internet (e.g., over the VPN connection between a VPN terminator and the micro-type base station). Thereafter, the micro-type base station may operate using the operating parameters specified by the micro-type base station controller.

It can sometimes happen that a micro-type base station is unable to acquire an initial SPS fix. For example, the micro-type base station may be deployed in a location that does not receive sufficient SPS reception, such as in the basement of a home, where the micro-type base station does not receive sufficient SPS reception for acquiring an initial SPS location fix. Or it may be deployed in a high-rise building, multiple-dwelling unit, office building, and/or any other situation where the micro-type base station similarly does not receive sufficient SPS reception to acquire an initial SPS fix. It would therefore be desirable for a micro-type base station to be able to determine its location when it is otherwise unable to acquire an initial SPS fix.

Accordingly, example embodiments described herein provide systems and methods for a base station to determine its location when it is unable to make a satellite-based location determination. Specifically, when base station attempts and fails to acquire a satellite-based location fix, it can identify WCDs operating within its service range, and query them for their respective neighbor lists. Upon receiving neighbor lists from one or more of the queried WCDs, the base station can merge the lists into a composite list. The base station can then determine the locations of the base stations in the composite list, and compute a centroid from the locations. The base station can then adopt the centroid location as its own location.

Hence, in one respect, various embodiments of the present invention provide, a method implemented by a base station of a wireless communication system, the method comprising: initiating wireless data communications with each of a group of wireless communication devices within a coverage area of the base station; subsequent to initiating the wireless data communications, transmitting a request to each respective wireless communication device of the group for a respective list of other base stations available for serving the respective wireless communication device; in response to the request, receiving respective lists from one or more wireless communication devices of the group; merging the received respective lists into a composite list of other base stations available for serving the one or more wireless communication devices of the group; and estimating a location of the base station based on the locations of the base stations in the composite list.

In another respect, various embodiments of the present invention provide a base station configured for operating in a wireless communication system, the base station comprising: one or more processors; memory accessible by the one or more processors; and machine-readable instructions stored in the memory, that upon execution by the one or more processors cause the base station to carry out functions including: initiating wireless data communications with each of a group of wireless communication devices within a coverage area of the base station, subsequent to initiating the wireless data communications, transmitting a request to each respective wireless communication device of the group for a respective list of other base stations available for serving the respective wireless communication device, in response to the request, receiving respective lists from one or more wireless communication devices of the group, merging the received respective lists into a composite list of other base stations available for serving the one or more wireless communication devices of the group, and estimating a location of the base station based on the locations of the base stations in the composite list.

In still another respect, various embodiments of the present invention provide a non-transitory computer-readable medium having instructions stored thereon that, upon execution by one or more processors of a base station, cause the base station to carry out functions including: initiating wireless data communications with each of a group of wireless communication devices within a coverage area of the base station; subsequent to initiating the wireless data communications, transmitting a request to each respective wireless communication device of the group for a respective list of other base stations available for serving the respective wireless communication device; in response to the request, receiving respective lists from one or more wireless communication devices of the group; merging the received respective lists into a composite list of other base stations available for serving the one or more wireless communication devices of the group; and estimating a location of the base station based on the locations of the base stations in the composite list.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments presented herein will be described by way of example with reference to wireless communication systems in general, and to third generation partnership project (3GPP) Long Term Evolution ("LTE") Advanced communication systems in particular. It will be appreciated that wireless communication systems employ a range of technologies designed to operate according to a number of related standards and protocols, including, without limitation, IS-2000, IS-856, IMT-2000, WiMax, and WiFi, among others, in order to deliver both circuit-cellular and wireless packet-data services. Underlying access technologies include CDMA, time division multiple access (TDMA), and orthogonal frequency division multiple access (OFDMA), among others.

Wireless communications systems are generally classified under the umbrella of one or another representative system architecture. One example is a "CDMA network," which, despite its label, can include both CDMA-based wireless access (e.g., as specified under IS-2000) and TDMA-based wireless access (e.g., as specified under IS-856), among other technologies. Other examples include "UMTS networks," which also can include CDMA-based wireless access (e.g., as specified under IMT-2000), and "LTE Advanced networks," which can include OFDMA-based wireless access, and are sometimes considered as next-generation variants of, and deployed within, UMTS networks. While the discussion herein focuses on embodiments in LTE Advanced networks, it should be understood that embodiments in other types wireless communication systems are possible, including, without limitation, CDMA networks and UMTS networks, and that the example of LTE Advanced should not be viewed as limiting.

Figure 1:
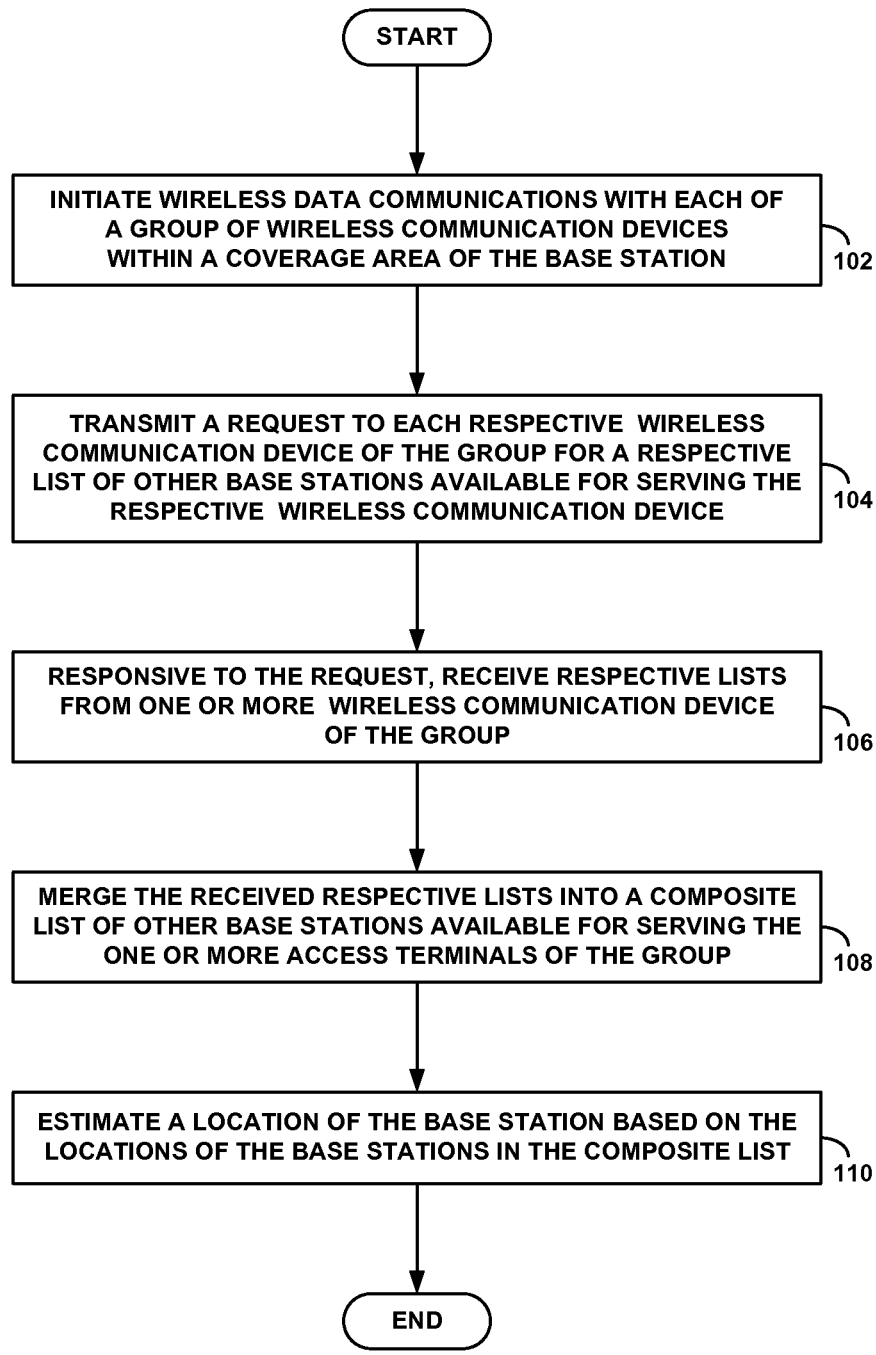
FIG. 1 is a flowchart depicting an example embodiment of a method of determining base station location from neighbor lists of client devices, in accordance with example embodiments.

FIG. 1 is a flowchart depicting an example embodiment of a method of determining base station location from neighbor lists of client devices. By way of example, the steps of the flowchart could be implemented in a base station configured for operating in a wireless communication system. In accordance with the example embodiment, the wireless communication system could include both macro-type base stations (or "macro base stations") and micro-type base stations (or "micro base stations"). The macro base station could be a cell or a sector, and the micro base station could be a microcell, picocell, or femtocell.

Also by way of example, the macro and micro base stations could further be macro and micro "evolved NodeB" (eNodeB) elements, each configured to operate under LTE Advanced. Alternatively, the macro and micro base stations could further be macro and micro NodeB elements configured to operate under UMTS. As still a further alternative, the macro base station could include a BTS configured to operate under IS-2000 and/or IS-856, and the micro base station could include a picocell or femtocell similarly configured to operate under IS-2000 and/or IS-856.

At step 102, the base station initiates wireless data communications with each of a group of wireless communication devices within a coverage area of the base station. In accordance with the example embodiment, the base station could be a micro base station, such a femtocell. When the micro base station powers up, it can scan operational frequencies to identify WCDs within its coverage range, and establish communication sessions with one or more of them.

At step 104, after initiating the wireless data communications, the base station transmits a request to each respective wireless communication device of the group for a respective list of other base stations available for serving the respective wireless communication device. In accordance with the example embodiment, each respective list could be a neighbor list for the respective WCD. The base station's request could then be a request to each WCD to transmit its neighbor list back to the base station.

At step 106, the base station receives respective lists from one or more wireless communication devices of the group in response to its request. More specifically, one or more of the WCDs may respond to the request by transmitting its neighbor list to the base station.

At step 108, the base station merges the received respective lists into a composite list of other base stations available for serving the one or more wireless communication devices of the group. In accordance with the example embodiment, the base station could form a single list of all the base stations (or other forms of coverage areas, such as cells and sectors) into a single list. In doing so, the base station could avoid making duplicate entries that might otherwise occur if the same neighbor base station appears in more than one of the neighbor lists.

Finally, at step 110 the base station estimates its location based on the locations of the base stations in the composite list. Specifically, the base station can, as described below, determine the locations of the base stations in the composite neighbor list. It can then compute a centroid location from the determined locations, and adopt the centroid location as its own location.

In accordance with the example embodiment, the micro base station can initiate wireless data communications with each of the group of WCDs in response to first attempting and failing to acquire a satellite-based positioning system fix with the satellite-based positioning system receiver. More specifically, after powering on, the micro base station can attempt to acquire a satellite-based positioning system fix. If it fails to acquire a satellite-based positioning system fix within a predetermined amount of time, the micro base station can the take actions to initiate wireless data communications with each of the group of WCDs.

Also in accordance with the example embodiment, each list could include information indicating an identity for each base station in the list. For example, each list could be a neighbor list that includes a cell or sector identifier such a "PN code" (described below) and an operating frequency for each base station in the list. Estimating the location of the base station based on the locations of the base stations in the composite could entail determining respective locations for a plurality of base stations in the composite list, and determining a centroid location based on the respective locations for the plurality. The base station could then adopt the centroid location as its own location. The centroid location could be a simple average of the latitudes and an average of the longitudes of the locations of the base stations in the composite list. Other methods of determining the centroid location could be used as well.

In further accordance with the example embodiment, the base station and the base stations in the composite list could be communicatively connected by a backhaul network of the wireless communication system. Determining the respective locations for the plurality of base stations in the composite list could then entail sending a location request to each respective base station of the plurality of base stations via the backhaul network, and subsequently receiving a respective response from each of the plurality of base stations via the backhaul network. Each respective response could include information indicating a location of the respective base station, such as latitude and longitude.

Alternatively, determining the respective locations for the plurality of base stations in the composite list could then entail sending the identity for each base station in the composite list to a server device in the wireless communication system, such as a PDE, and thereafter receiving from a response including information indicating a location of each of a plurality of base stations in the composite list. For example, the base station could send the composite list (e.g., composite neighbor list) to a PDE in a request message. The PDE could respond with a message including the locations of at least some of base stations.

In an alternative arrangement, estimating the location of the base station based on the locations of the base stations in the composite could entail sending information indicating the identity for each base station in the composite list (e.g., composite neighbor list) to a server device in the wireless communication system. For example, the base station could send the composite list in a location request message to the server device. The server device could then respond by determining a centroid location from the locations of the base stations in the list, and return the centroid to the base station. The base station could then adopt the centroid location as its own location. By way of example, the network server device could be a PDE. The PDE could determine the locations of the base stations in the composite list, compute a centroid location, and return the centroid location to the requesting base station.

It will be appreciated that the example embodiment illustrated in FIG. 1 could include alternate and/or additional steps, while still remaining within the scope and spirit of example embodiments herein.

Figure 2:
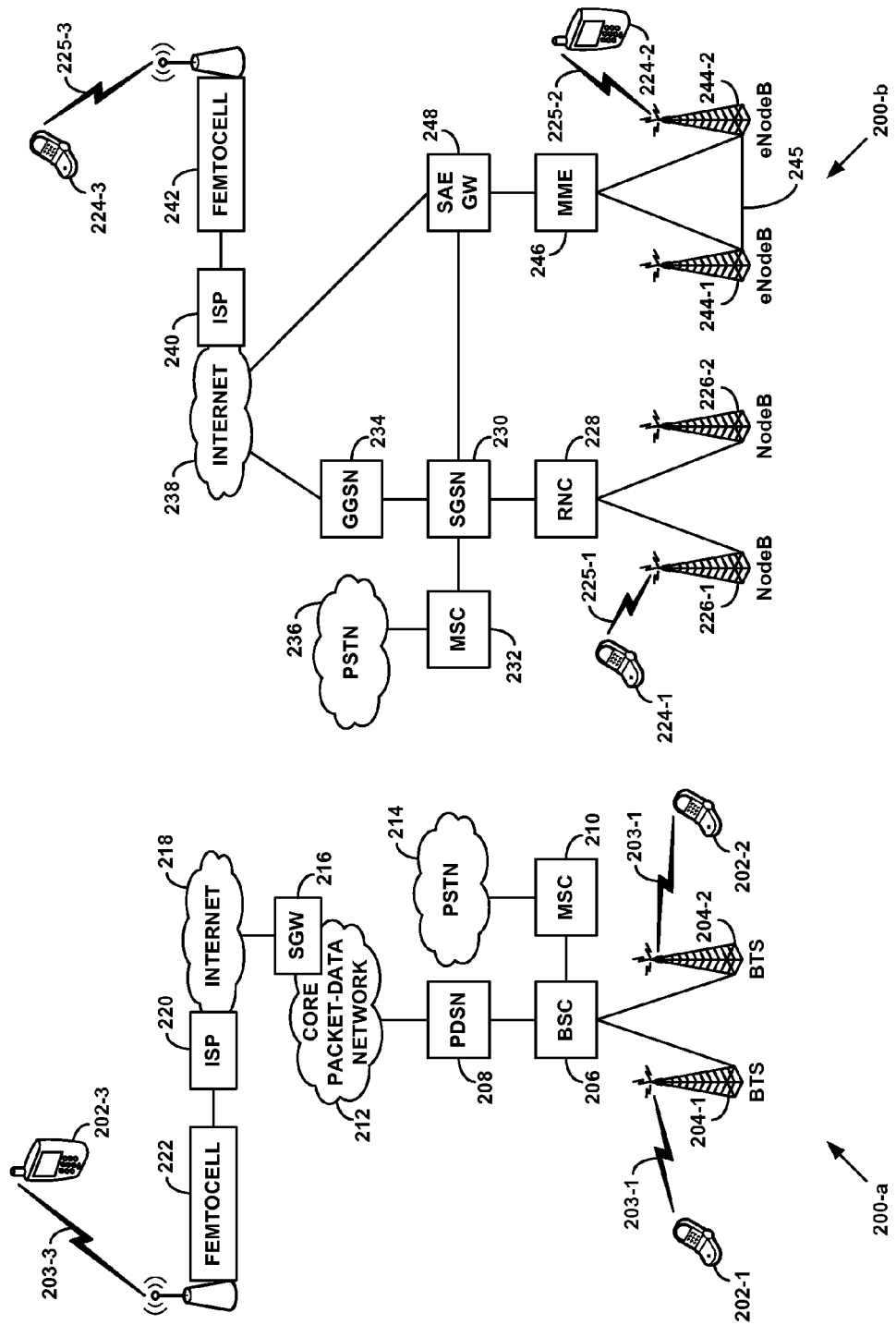
FIG. 2a is a simplified block diagram of a first type of example wireless communication system in which an example embodiment of a method of determining base station location from neighbor lists of client devices could be carried out.
FIG. 2b is a simplified block diagram of a second type of example wireless communication system in which an example embodiment of a method of determining base station location from neighbor lists of client devices could be carried out.

FIG. 2a shows a simplified block diagram of an example CDMA network 200-a that can be operated by a wireless service provider, and in which an example method of determining base station location from neighbor lists of client devices can be employed. FIG. 2b similarly shows a simplified block diagram of an example combined UMTS/LTE Advanced network 200-b that can be operated by a wireless service provider, and also in which an example method of determining base station location from neighbor lists of client devices can be employed. It will be appreciated that the depiction of just these two types of example networks is presented herein for illustrative purposes, and is not intended to be limiting with respect to embodiments of determining base station location from neighbor lists of client devices, or to the types of networks in which such embodiments may be devised or deployed.

In the CDMA network 200-a, subscribers engage in communications in the wireless communication system via access terminals (as noted, the generally-used term for WCDs in a CDMA network) exemplified by ATs 202-1, 202-2 and 202-3. Accordingly, ATs 202-1, 202-2 and 202-3 may also be taken as representing subscribers in network 200-a. Similarly, in the UMTS/LTE Advanced network 200-b, subscribers engage in communications in the wireless communication system via user equipment entities (as noted, the generally-used term for WCDs in a UMTS/LTE Advanced network) exemplified by UEs 224-1, 224-2, and 224-3. Accordingly, UEs 224-1, 224-2, and 224-3 may similarly be taken as representing subscribers in network 200-b.

As shown in FIG. 2a, AT 202-1 communicates over an air interface 203-1 with a BTS 204-1, which is then coupled with a BSC 206. Similarly, AT 202-2 communicates over an air interface 203-2 with a BTS 204-2, which is then also coupled with a BSC 206; and AT 202-3 communicates over an air interface 203-3 with a femtocell 222, which is then coupled with the network 200a by way of a public internet 218 via a broadband connection between the femtocell and an internet service provider (ISP) 220. The air interfaces 203-1, 203-2, and 203-3 could support either or both of IS-2000 and IS-856 communications. Transmissions over the air interface 203-1 from the BTS 204-1 to the AT 202-1 represent a "forward link" from the BTS to the access terminal, while transmissions over interface 203-1 from the AT 202-1 to the BTS 204-1 represent a "reverse link" from the AT. The same definition of forward and reverse link applies for transmissions between the BTS 204-1 and the AT 202-2 over the air interface 203-1, and similarly for transmissions between the femtocell 222 and the AT 202-3 over the air interface 203-3.

BSC 206 is connected to MSC 210, which acts to control assignment of air traffic channels (e.g., over air interface 203-1, 2, 3), and provides access to wireless circuit-switched services such as circuit-voice and circuit-data (e.g., modem-based packet data) service. As represented by its connection to PSTN 214, MSC 210 is also coupled with one or more other MSCs, other telephony circuit switches in the operator's (or in a different operator's) network, or other wireless communication systems, thereby supporting user mobility across MSC regions, roaming between systems, and local and long-distance landline telephone services.

BSC 206 is also connected a PDSN 208, which in turn provides connectivity with the service provider's core packet-data network 212. Communications between the core network 212 and a public Internet 218 or the like are facilitated by a security gateway (SGW) 218, which may provide protective/defensive communication functionalities (e.g. firewalls or the like), as well as support secure communication channels between endpoints in the core network 212 and trusted, external devices such as the femtocell 222. By way of example, a secure communication channel could be an encrypted virtual private network (VPN) "tunnel" between the femtocell 222 and the SGW 216 or other VPN termination point in the core network 212.

Additional inter-network security gateways or border routers may support interconnections with other external packet networks. Although not shown in the figure, the core network 212 may also host servers and routers for supporting various operations, functions, and services, such as service management and user mobility. Examples of such network components include, without limitation, one or more authentication, authorization, and accounting (AAA) servers, and one or more mobile-IP home agents (HAs). The core network 212 could include additional switches, routers, and gateways that collectively provide transport and interconnection among the various entities and networks of network 200-a. In this context, for instance, core network 212 could be an overlay on or a sub-network of one or more additional networks.

Communications in the UMTS/LTE Advanced network 200-b are illustrated in FIG. 2b. Within the UMTS RAN, shown on the bottom left side of the figure, UE 224-1 communicates with NodeB 226-1 over air interface 225-1, which could support IMT-2000 communications, for example. Transmissions over the air interface 225-1 from the NodeB 226-1 to the UE 224-1 represent a "downlink" from the NodeB to the UE, while transmissions over interface 225-1 from the UE 224-1 to the NodeB 226-1 represent an "uplink" from the UE. The NodeB 226-1 is coupled with the RNC 228, which, by way of example, is also depicted as controlling a NodeB 226-2.

In addition to control of the NodeB elements, the RNC 228 also connects the access network with a core network, which in a UMTS system is typically configured according an architecture referred to as General Packet Radio Service (GPRS), as is known. More specifically, the RNC 228 is coupled with a Serving GPRS Support Node (SGSN) 230, which is coupled with MSC 232 and PSTN 236 for cellular communications services. The SGSN 230 is also coupled with a Gateway GPRS Support Note (GGSN) 234, which in turn provides secure connectivity with the public internet 238.

Within the LTE Advanced RAN, shown on the bottom right side of FIG. 2b, UE 224-2 communicates with eNodeB 244-1 over air interface 225-2. As in the UMTS RAN, transmissions over the air interface 225-2 from the eNodeb 244-1 to the UE 224-2 represent a downlink from the eNodeB to the UE, while transmissions over interface 225-2 from the UE 224-2 to the eNodeB 244-1 represent an uplink from the UE. Under LTE Advanced, the downlink operates according to OFDMA, while the uplink operates according to Single Carrier Frequency Division Multiple Access (SC-FDMA), as is known.

As shown, the eNodeB 244-1 is coupled with the MME 224, which, by way of example, is also depicted as controlling an eNodeB 244-2. The two eNodeBs 244-2 and 244-2 also have a so-called "X-2" communication link 245 between them for support direct communications according to LTE Advanced protocols. The MME 224 is coupled with a System Architecture Evolution Gateway (SAE GW) 230, which in turn provides secure connectivity to the Internet 238, as well as the core GPRS network via a communicative coupling with the SSGN 230.

Access to the UMTS/LTE Advanced network via a femtocell 242 is shown at the top of FIG. 2b, where UE 224-3 is shown to have a downlink from and an uplink to the femtocell 242 over the air interface 225-3. The air interface could support either or both of IMT-2000 or OFDMA/SC-FDMA as defined for LTE Advanced. As illustrated, the femtocell 242 is connected to the core GPRS network by way of the Internet 238, via a broadband connection between the femtocell and the ISP 240. As in the network 200-a in FIG. 2a, the connection with the GPRS network can be based on a secure VPN or the like.

Although not shown in FIG. 2b, the GPRS core network may also host servers and routers for supporting various operations, functions, and services, such as service management and user mobility. Examples of such network components include, without limitation, one or more authentication, authorization, and accounting (AAA) servers, and one or more mobile-IP home agents (HAs). The GPRS core network could also include additional switches, routers, and gateways that collectively provide transport and interconnection among the various entities and networks of network 200-b.

It should be understood that the depiction of just one or two of each network element in both FIG. 2a and FIG. 2b is illustrative, and there could be more of any of them, as well as other types of elements not shown. The particular arrangements shown in FIG. 2a and FIG. 2b should not be viewed as limiting with respect to the example embodiments presented herein. Further, the network components that make up a wireless communication system such as network 200-a or network 200-b are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device such as example ATs 202-1, 202-2, and 202-3 or example UEs 224-2, 224-2, and 224-3, typically comprises a user-interface, I/O components, a communication interface, a tone detector, a processing unit, and data storage, all of which may be coupled together by a system bus or other mechanism. As such, networks 200-a and 200-b, ATs 202-1, 202-2, and 202-3, and UEs 224-2, 224-2, and 224-3, and air interfaces 203-1, 203-2, and 203-3, and 225-2, 225-2, and 225-3 collectively are representative of example means of implementing and carrying out the various functions, steps, and procedures described herein.

Figure 3:
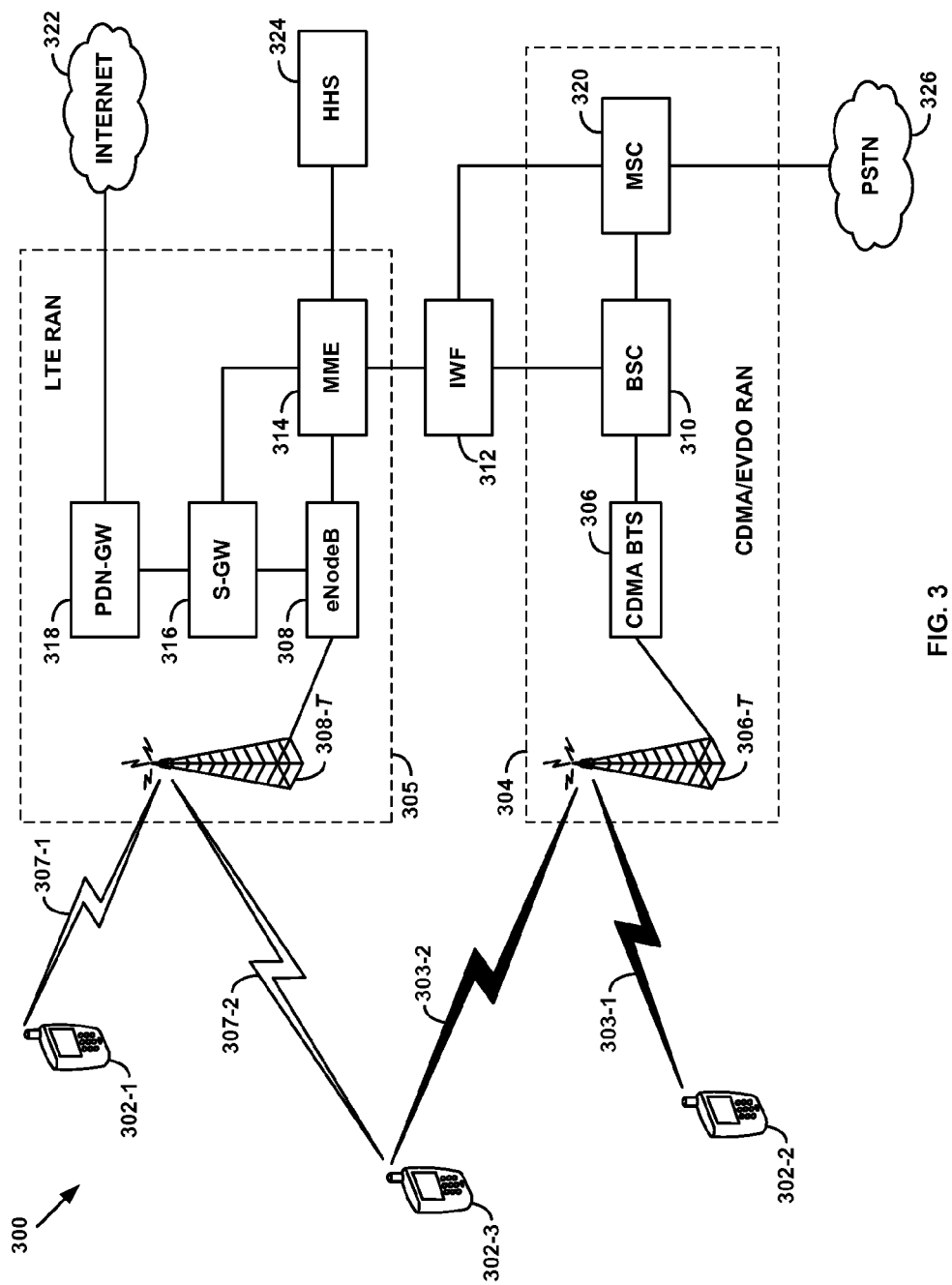
FIG. 3 is a simplified block diagram of two example RANs of an example of wireless communication system in which determining base station location from neighbor lists of client devices could be implemented, in accordance with example embodiments.

While FIGS. 2a and 2b depict the example CDMA network 200-a and the example UMTS/LTE Advanced network 200-b as separate networks, some service providers may deploy both types of wireless access technologies in a single network. FIG. 3 shows a simplified block diagram of an example such a multi-air-interface wireless network 300 that can be operated by a wireless service provider, and in which an example method of determining base station location from neighbor lists of client devices can be carried out. By way of example, the network 300 includes RAN 304 configured to support both CDMA-based air interface communications (e.g., as specified under both IS-2000 and IS-856), RAN 305 configured to support OFDMA-based air interface communications (e.g., as specified under LTE Advanced). For convenience in discussing the example embodiments presented herein, the term "EVDO RAN" will be used for referring to the RAN 304, and the term "LTE RAN" will be used for referring to the RAN 305. It will be appreciated that a network such as network 300 could include support for other types of air-interface technologies as well.

The EVDO RAN 304 includes a CDMA BTS 306 with a CDMA/EVDO air interface antenna 306-T for providing services according to CDMA/EVDO. The LTE RAN 305 includes an LTE eNodeB 300 with an LTE air interface antenna 308-T for providing services according to LTE.

The example illustrated in FIG. 3 also shows three WCDs 302-1, 302-2, and 302-3, each depicted as having at least one active air interface of a particular type with one or another of the antennas 306-T or 308-T. Specifically, the WCD 302-1 has an air interface 301-1 with the LTE RAN 305 via the eNodeB 308 and the associated antenna 308-T. The WCD 302-2 has an air interface 303-1 also with the EVDO RAN 304 via the BTS 306 and the associated antenna 306-T. The WCD 302-2 has two different air interfaces: an air interface 303-2 with the EVDO RAN 304 via the BTS 306 and the associated antenna 306-T, and an air interface 307-2 with the LTE RAN 305 via the eNodeB 308 and the associated antenna 308-T.

As a visual cue, the LTE air interfaces are depicted as white-filled "lightning bolts," and the EVDO air interfaces are depicted as blackened "lightning bolts." The two air interfaces 307-2 and 303-2 depicted for the WCD 302-3 may be taken as representing a capability of the WCD 302-3 to operate according to either air interface separately, and/or to operate according to both concurrently.

For communications under LTE (or LTE Advanced) based protocols, subscribers may engage in communications via the eNodeB 308 and the associated antenna 308-T from the WCD 302-1 over air interface 307-1 and/or from the WCD 302-3 over air interface 307-2. Transmissions over the air interface 307-1 from the antenna 308-T to the WCD 302-1 represent a downlink from the eNodeB 308 to the WCD 302-1, while transmissions over air interface 307-1 from the WCD 302-1 to the antenna 308-T represent an uplink from the WCD 302-1. Similarly, transmissions over the air interface 307-2 from the antenna 308-T to the WCD 302-3 represent a downlink from the eNodeB 308 to the WCD 302-3, while transmissions over air interface 307-2 from the WCD 302-3 to the antenna 308-T represent an uplink from the WCD 302-3. Under LTE Advanced, the downlink operates according to OFDMA, while the uplink operates according to Single Carrier Frequency Division Multiple Access (SC-FDMA).

The eNodeB 308 may be connected to a serving gateway S-GW 316, which in turn may be connected to an internet 322 via a packet data network gateway PDN-GW 318. The eNodeB 308 could also be connected to the S-GW 316 by way of a mobility management entity MME 314, which may also be configured to control communications between the eNodeB 308 and one or more other eNodeBs in the network. The MME 314 may also be communicatively coupled to a home subscriber server (HSS) 324, which stores subscriber information, including information about the WCD 302-1 and/or WCD 302-3. For cellular voice communications, the eNodeB may connect to a MSC 320 by way of an interworking function IWF 312 communicatively connected between the MME 312 and the MSC 320. The MSC 320 may then provide connectivity of a PSTN 326, as shown.

For communications under CDMA based protocols, subscribers may engage in communications via the BTS 306 and the associated antenna 306-T from the WCD 302-2 over air interface 303-1 and/or from the WCD 302-3 over air interface 303-2. Transmissions over the air interface 303-1 from the antenna 306-T to the WCD 302-2 represent a forward link from the CDMA/EVDO BTS 306 to the WCD 302-2, while transmissions over air interface 303-1 from the WCD 302-2 to the antenna 306-T represent a reverse link from the WCD 302-2. Similarly, transmissions over the air interface 303-2 from the antenna 306-T to the WCD 302-3 represent a forward link, while transmissions over air interface 303-2 from the WCD 302-3 to the 306-T represent a reverse link.

The CDMA BTS 306 may be connected to a BSC 310, which provides a connection to the MSC 320 for cellular voice communications. The MSC 320 acts to control assignment of air traffic channels (e.g., over air interfaces 303-1 and 303-2), and provides access to wireless circuit-switched services such as circuit-voice and circuit-data (e.g., modem-based packet data) service. As represented by its connection to the PSTN 326, the MSC 320 may also be coupled with one or more other MSCs, other telephony circuit switches in the operator's (or in a different operator's) network, or other wireless communication systems, thereby supporting user mobility across MSC regions, roaming between systems, and local and long-distance landline telephone services.

For packet data communications, the IWF 312 connected between the BSC 310 and the MME 314 can support interworking between EVDO based packet protocols and those of the LTE Advanced based network. Thus, the BSC 310 may communicate on the internet 322 by way of the MME 314, the S-GW 316, and the PDN GW 318.

1. EXAMPLE ACCESS TECHNOLOGIES a. CDMA Communications

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code. The power allocated to each channel is determined so as to optimize the signal to noise characteristics of all the channels, and may vary with time according to the number of WCDs being serviced, and their relative positions with respect to the BTS, among other factors.

Air interface communications are divided into forward link communications, which are those passing from the base station to the WCD, and reverse link communications, which are those passing from the WCD to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of WCDs between sectors, under IS-2000 a WCD can communicate on a given carrier frequency with a number of "active" sectors concurrently, which collectively make up the WCD's "active set." Depending on the system, the number of active sectors can be up to six (currently). The WCD receives largely the same signal from each of its active sectors and, on a frame-by-frame basis, selects the best signal to use. A WCD's active set is maintained in the WCD's memory, each active sector being identified according to its PN offset.

The WCD continually monitors a pilot signal from each of its active sectors as well as from sectors in a "neighbor list" of other sectors generally neighboring the active sectors. The pilot signal strengths may vary as the WCD moves about within the wireless communication system, or as other factors cause the WCD's RF conditions to change. More particularly, the WCD monitors a signal-to-noise metric referred to as "signal to interference plus noise ratio" ("SINR"), which includes the degrading effects of interference as well as noise on RF conditions. The WCD reports the received signal strengths to the serving base station, which then directs the WCD to update its active set from among its current active set and, more broadly, from among its neighbor list, in accordance with the reported strengths and one or more threshold conditions. Note that a WCD's active set can include a femtocell.

Typically, the power level of the pilot detected by a WCD is specified as a gain level, x, according to the relation x dBm=$10 \log_{10}(P/1 \text{ mW})$, where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=$10 \log_{10}(P_1/P_2)$. For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

b. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856 (or EVDO).

IS-856 leverages the asymmetric characteristics of most IP traffic, in which the forward link typically carries a higher load than the reverse link. Under IS-856, each WCD maintains and manages an active set and a neighbor list as described above, but receives forward-link transmission from only one active sector at a time. In turn, each sector transmits to all its active WCDs on a common forward link using time division multiplexing (TDM), in order to transmit to only one WCD at a time, but at the full power of the sector. As a result of the full-power allocation by the sector, a WCD operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a data rate control (DRC) channel used by the WCD to indicate the supportable data rate and best serving sector for the forward link. More specifically, the WCD monitors SINR on the forward link from its serving sector (or base station) to determine a data rate to request. The requested data rate is encoded in a DRC request, and transmitted to the serving base station on the DRC channel, which is a sub-channel of a reverse-link Medium Access Control (MAC) channel. TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

c. LTE Advanced Communications

Under LTE Advanced, the downlink comprises multiple frequency carrier bands arranged to cover a total bandwidth of up to 20 MHz (currently) in frequency space. Each frequency carrier band is divided into 12 orthogonal subcarrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, the downlink comprises time slots, each typically of 0.5 msec duration. Every two time slots makes up one "sub-frame" of 1.0 msec duration, and every 10 sub-frames makes up a 10 msec frame. Each time slot is subdivided into an integer number of symbol durations, such that the integer number multiplied by the symbol duration equals 0.5 msec. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions on the downlink are scheduled in time-frequency units referred to as "resource blocks" or RBs. Each RB is made up of 7 contiguous symbol durations (i.e., one time slot) and 12 subcarrier frequencies of a given frequency carrier band. Thus, an RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols.

A single RB is the smallest unit of allocation made for a given WCD for downlink transmissions. Allocations are typically made by an eNodeB serving the WCD, and more than one RB can be allocated for the WCD. Multiple RB allocations for a given WCD can be made across multiple frequency carrier bands, across multiple time slots, or both, depending on factors including the amount of data to be transmitted to the WCD, the type of data (e.g., best-effort, real-time, etc.), and downlink resources needed for other WCDs.

In addition to carrying OFDM symbols specific to a given WCD, particular resource elements of a given RB are allocated as "reference signals," and may be used to carry pilot signals from the eNodeB. Upon detection of a pilot signal in one or more resource elements of an RB, a WCD may determine SINR of the eNodeB (or more generally, the LTE Advanced base station) that made the RB-based transmission. The WCD may then use the SINR (or other SNR measure) of different eNodeBs that it detects to determine if and when to hand off from one to another, for example.

Under LTE, the network provides the WCD with neighbor lists that identifies neighboring eNodeBs that may be suitable candidates for service for the WCD. The WCD can measure signal quality of those eNodeBs in the neighbor list that it can detect, and report the measurements back to the network. The network can then decide if a handover (as handoff is referred to under LTE) is warranted.

2. MICRO BASE STATION LOCATION DETERMINATION

In wireless networks, such networks 200-*a*, 200-*b*, and 300, the geographic locations of the base stations (e.g., BTSs and eNodeBs) serve a variety of operational and management functions. For example, emergency services may use location information to determine where an emergency call is originating from. Other location-based services may need location information as well. A service provider could also use location information for coverage planning and evaluation.

Macro base stations are typically deployed under the auspices of a service provider's operations management as network infrastructure elements, having fixed locations that may be recorded largely as static information. By contrast, installation and/or deployment of micro base stations, and in particular consumer-type devices (e.g., consumer femtocells), may take place largely outside of the service provider's control, at least with regard to where they are placed. In order to determine its location, a micro base station can invoke location-determination procedure when it powers up and undertakes to connect to a wireless network.

One conventional approach to micro base station location determination is to enlist the assistance of a satellite-based location determination system, such a GPS system. More particularly, a micro base station can be equipped with a satellite-based positioning system (SPS) receiver, such as a GPS receiver, capable of receiving and decoding SPS signals. When the micro base station powers on (or possibly in response to some other command or triggering event), it can use its SPS receiver to attempt to obtain an initial SPS fix, which typically involves receiving signals from multiple (e.g., three or four) satellites and using those signals to compute its location. Additionally or alternatively, the micro base station may determine its location with the assistance of a network entity such as a PDE. For instance, the micro base station can use its Internet connection to send the data that it receives from the multiple SPS satellites to the PDE, and the PDE may then do the necessary calculations and return a location (e.g., latitude, longitude) to the micro base station.

It can happen that a micro base station is installed in a location at which it cannot acquire a SPS fix. For example, the micro base station might be installed in the basement of a building, or in the midst of several high-rise buildings that may block satellite signals. In such a circumstance, a micro base station might receive too weak a signal from one or more satellites to be able to make a location determination.

Figure 4:
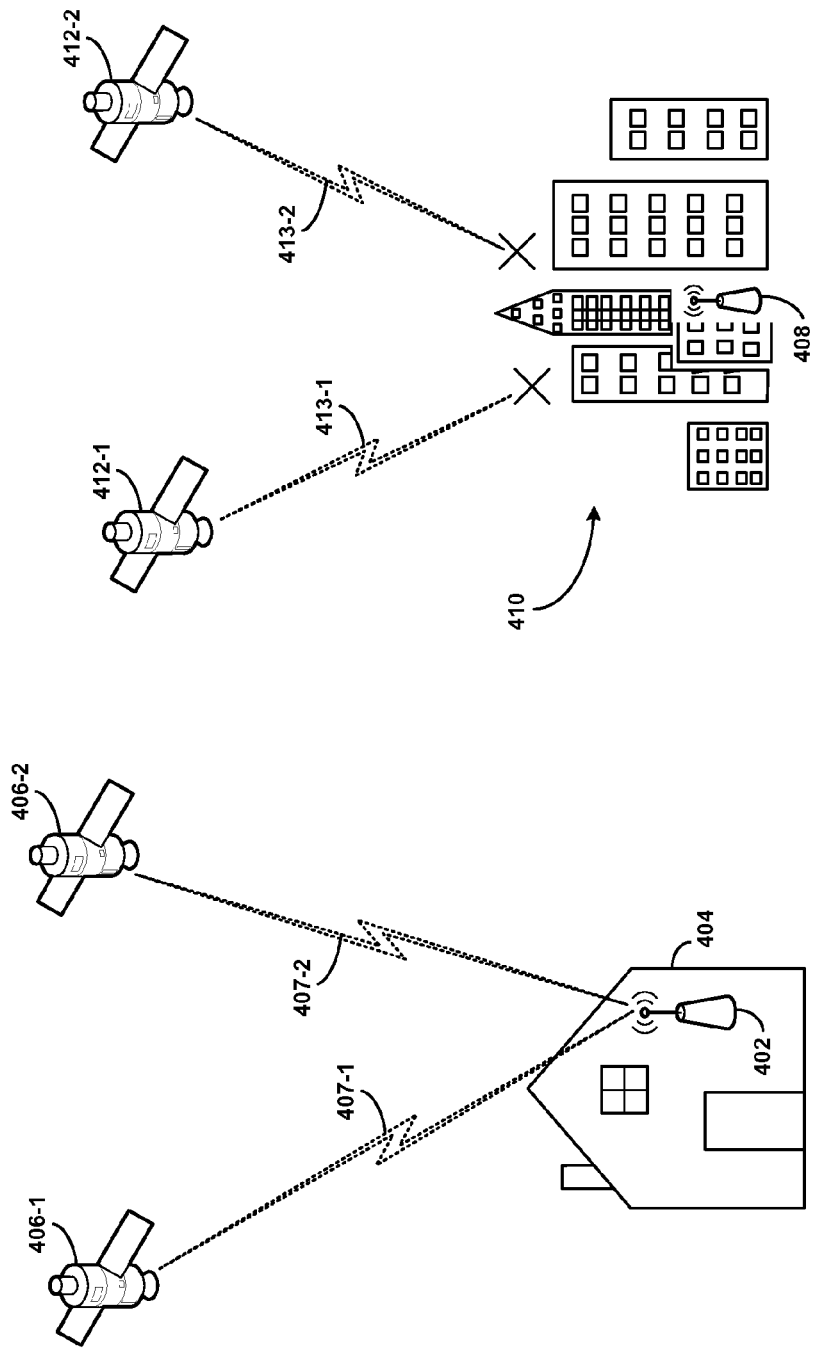
FIG. 4 is an illustrative representation of different deployment configurations in which a base station may attempt to acquire a satellite-based location fix.

FIG. 4 illustrates two example representative installation configurations of a micro base station in relation to SPS satellites, such as GPS satellites. On the left side of FIG. 4, a micro base station 402 is depicted as being located inside a house 404, and with adequate signal coverage from SPS satellites 406-1 and 406-2. Communication links 407-1 and 407-2 between the micro base station 402 and the SPS satellites 406-1 and 406-2 represent SPS signals detected at a level sufficient to allow decoding and location determination by the micro base station 402.

On the right side of FIG. 4, a micro base station 408 is depicted as being located inside a building within a city 410. For this example, signals from SPS satellites 412-1 and 412-2 are not detected strongly enough by the micro base station 408 to allow decoding and/or location determination. In the illustration, signals of communication links from 413-1 and 413-2 the SPS satellites 412-1 and 412-2 are depicted as being blocked from reaching the micro base station 408. As a result, the base station 408 may fail to acquire an SPS location fix.

In accordance with example embodiments, when a micro base station, such as micro base station 408, fails to acquire a satellite-based location fix upon power up, the micro base station can scan its operational frequencies in search of WCDs that may be operating near or within its coverage area. Upon identifying such WCDs, the micro base station can then initiate wireless data communications with them. Once in communication with the WCDs, the micro base station can send each WCD a request to obtain the WCD's neighbor list. After the micro base station receives one or more neighbor lists from the WCDs in reply to its request, the micro base station can the merge the received neighbor lists into a composite neighbor list. The micro base station can then take actions to determine the locations of the base stations (or other form of coverage areas) in the composite neighbor list, and compute a centroid location from the determined locations. Finally, the micro base station can adopt the centroid location as its own location.

Figure 5:
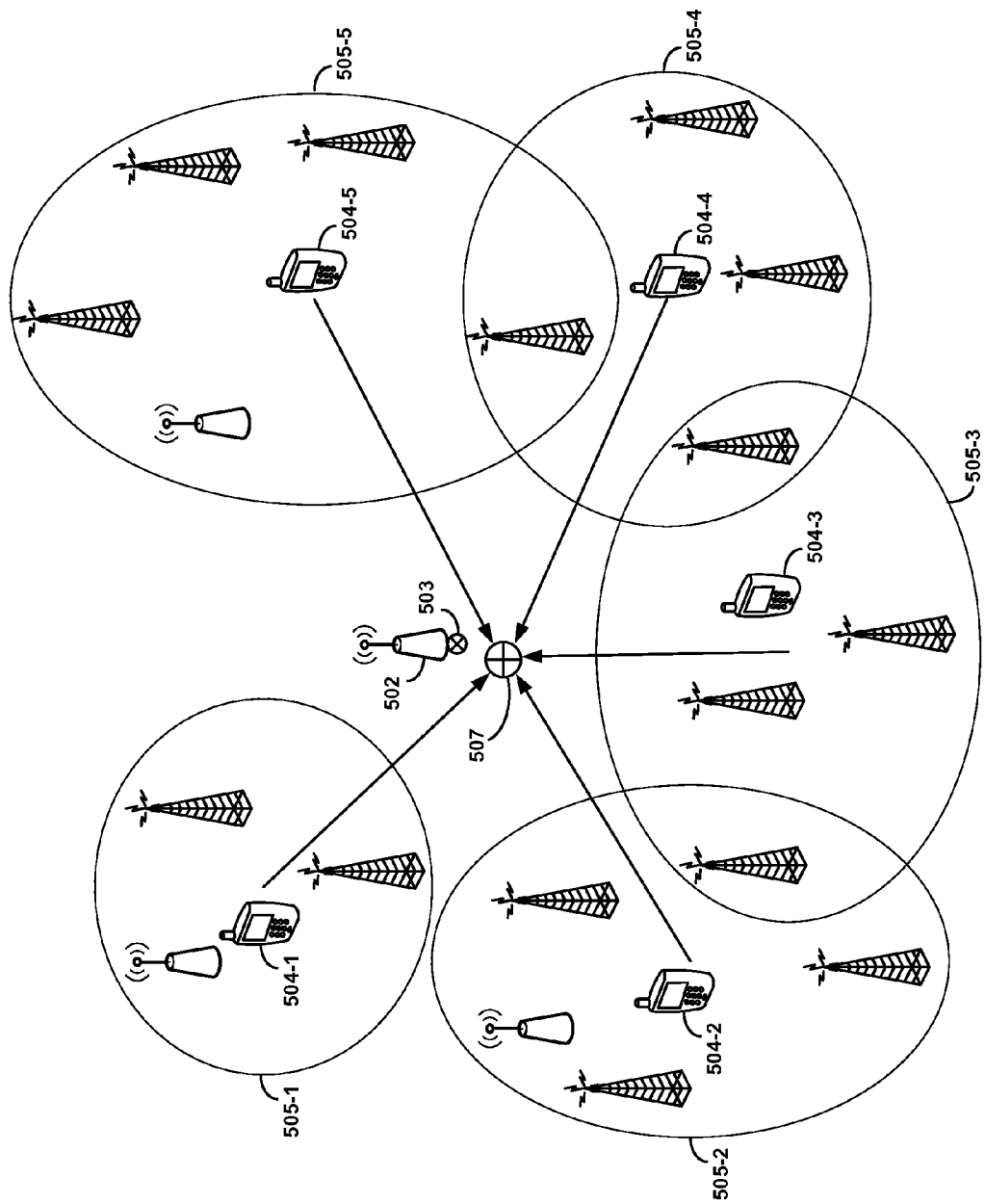
FIG. 5 illustrates example operation of a base station determining its location from neighbor lists of client devices could be implemented, in accordance with example embodiments.

FIG. 5 is a conceptual illustration of operation of determining base station location from neighbor lists of client devices (e.g., WCDs). In the figure, a micro base station 502 is shown to be at an actual location 503. For purposes of the illustration, it may be assumed that when the micro base station 502 is powered on, it finds itself unable to get a SPS location fix. Therefore, it doesn't know what its location is. In accordance with example embodiments, the micro base station 502 will search for WCDs (i.e., client devices) operating in or near its coverage range. By way of example, the micro base station 502 identifies five WCDs 504-1, 504-2, 504-3, 504-4, and 504-5, and initiates wireless communications with each of them. After establishing wireless communications with the WCDs 504-1, 504-2, 504-3, 504-4, and 504-5, the micro base station 502 requests each of them to send its respective neighbor list. For purposes of illustration in FIG. 5, each of the WCDs 504-1, 504-2, 504-3, 504-4, and 504-5 is represented as being located within the coverage range of a respective "neighborhood" of base stations. Each neighborhood is shown within a respective oval around one of the respective WCDs, and each of the base stations within the respective oval are taken to represent base stations of the respective WCD's neighbor list.

Specifically, the oval 505-1 around the WCD 504-1 is depicted as enclosing three base stations (e.g., BTSs and/or femtocells), all three of which are then assumed to be in (or make up) the neighbor list of the WCD 504-1. Similarly, the oval 505-2 around the WCD 504-2 is depicted as enclosing five base stations, all of which are assumed to be in (or make up) the neighbor list of the WCD 504-2; the oval 505-3 around the WCD 504-3 is depicted as enclosing five base stations, all of which are assumed to be in (or make up) the neighbor list of the WCD 504-3; the oval 505-3 around the WCD 504-3 is depicted as enclosing four base stations, all of which are assumed to be in (or make up) the neighbor list of the WCD 504-4; and the oval 505-5 around the WCD 504-5 is depicted as enclosing five base stations, all of which are assumed to be in (or make up) the neighbor list of the WCD 504-5. It will be appreciated that the number of base stations in each WCD's neighbor list is an example, and not limiting with respect to example embodiments herein.

By way of example, all of the neighbor lists except for the one for the WCD 502-1 appear to share at least one base station in common with at least one other neighbor list. This need not be the case, but it is not excluded.

Once the micro base station 502 receives the neighbor lists from the identified WCDs, it can merge the lists into a composite neighbor list. In merging the lists, the micro base station 502 may avoid duplicate base station listing in the composite list. For example, each base stations that appears in more than one individual neighbor list can be listed only once in the composite list.

The micro base station 502 can use identifying information about each base station in the composite neighbor list to determine a location for each base station in the composite list. From the locations of the base stations in the composite list, a centroid location 507 may be computed, and the micro base station 502 can adopt the centroid location as its own. For purposes of illustration in FIG. 5, the centroid location 507 and the actual (but possibly unknown) location 503 are depicted as being different.

Conceptually, the WCDs identified by the micro base station may, on average, be distributed around the micro base station. While this may not necessarily be exactly the case, it is a reasonable expectation. Similarly, the base stations that make up each respective WCD's neighbor list are represented as being distributed around each respective WCD, on average. Again, while this may not necessarily be exactly the case, it is a reasonable expectation. Consequently, it can be expected that the centroid location computed from the composite neighbor list will also be reasonable estimate of the micro base station's true location.

In determining the centroid location, the micro base station can use the identifying information for each base station in the composite list to either contact the each base station directly and query it for its location, or send the identifying information (e.g., the composite list) to a server device in the network, which can the determine the respective locations and send them back to the micro base station. As an alternative, the server device itself could determine the centroid location and send the determined centroid location back to the micro base station.

In accordance with example embodiments, direct communication between the micro base station and the base stations in the composite neighbor list can be supported in an LTE network by the X-2 link between eNodeBs in such a network. In a CDMA/EVDO network, the micro base station might instead communicate with a BSC or other controlling RAN element or a PDE to request location information (or centroid location) for the base stations in the composite neighbor list.

Figure 6:
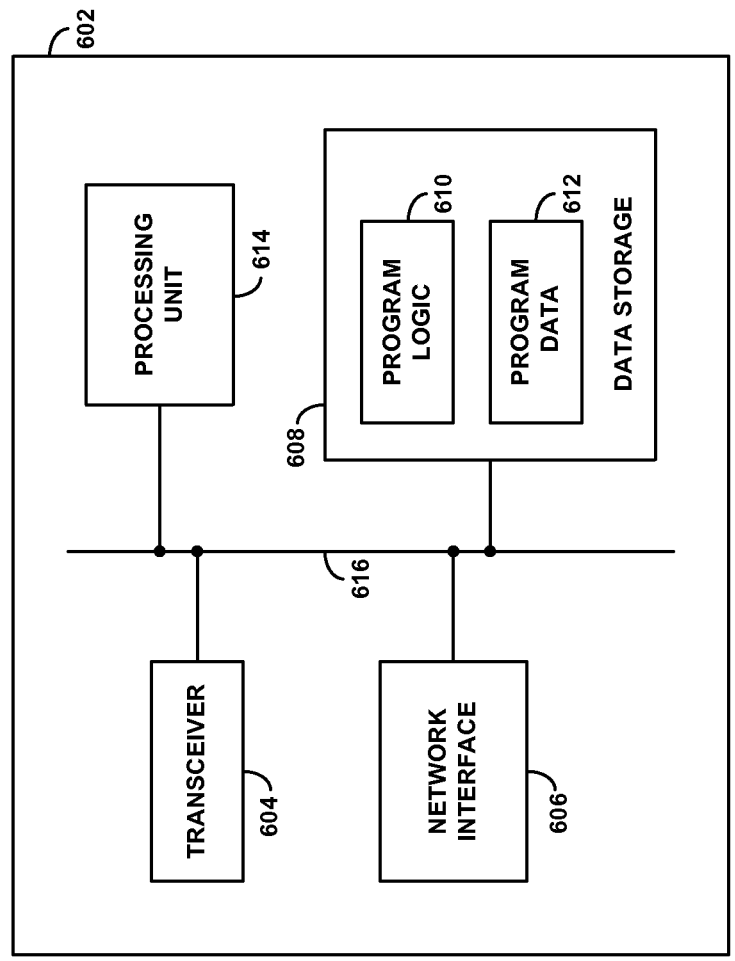
FIG. 6 is a simplified block diagram of a base station configured for carrying out location determination from neighbor lists of client devices, in accordance with example embodiments.

FIG. 6 is a simplified block diagram depicting functional components of an example base station 602, such as the micro base station 502, in which an example embodiment of determining base station location from neighbor lists of client devices could be implemented. As shown in FIG. 6, the example base station 602 includes a transceiver 604, network interface 606, a processing unit 614, and data storage 608, all of which may be coupled together by a system bus 616 or other mechanism. In addition, the base station 602 may also include external storage, such as magnetic or optical disk storage, although this is not shown in FIG. 6.

These components may be arranged to support wireless communications in a wireless communication network that is compliant with a variety of wireless air-interface protocols, such as networks 200-*a*, 200-*b*, and/or 300 illustrated in FIGS. 2*a*, 2*b*, and 3, respectively. In particular, these components can support determination of base station location from neighbor lists of client devices, in accordance with example embodiments.

Network interface 606 enables communication on a network, such networks 200 or 300. As such, network interface 606 may take the form of an Ethernet network interface card or other physical interface to a broadband connection to the internet or some other data network. Further, the base station 602 can also include a transceiver 604, which may include one or more antennas, enables air interface communication with one or more WCDs, supporting both downlink (or forward link) and uplink (or reverse link) transmissions.

Processing unit 614 comprises one or more general-purpose processors (e.g., INTEL microprocessors) and/or one or more special-purpose processors (e.g., dedicated digital signal processor, application specific integrated circuit, etc.). In turn, the data storage 608 comprises one or more volatile and/or non-volatile storage components, such as magnetic or optical memory or disk storage. Data storage 608 can be integrated in whole or in part with processing unit 614, as cache memory or registers for instance. As further shown, data storage 608 is equipped to hold program logic 610 and program data 612.

Program data 612 may comprise data configuration parameters. Program logic 610 may comprise machine language instructions that define routines executable by processing unit 614 to carry out various functions described herein. In particular the program logic, communication interface, and transceiver may operate cooperatively to carry out logical operation, such as that described by way of example in FIG. 1, as well other functions discussed above.

It will be appreciated that there can be numerous specific implementations of a base station, such as base station 602, in which determination of base station location from neighbor lists of client devices could be implemented. Further, one of skill in the art would understand how to devise and build such an implementation. As such, base station 602 is representative of means for carrying out determination of base station location from neighbor lists of client devices, in accordance with the methods and steps described herein by way of example.

4. CONCLUSION

An example embodiment has been described above. Those skilled in the art will understand, however, that changes and modifications may be made to this embodiment without departing from the true scope and spirit, which is defined by the claims.

We claim:

1. A method implemented by a base station of a wireless communication system, the method comprising:
    initiating wireless data communications with each of a group of wireless communication devices within a coverage area of the base station;
    subsequent to initiating the wireless data communications, transmitting a request to each respective wireless communication device of the group for a respective list of other base stations available for serving the respective wireless communication device;
    in response to the request, receiving respective lists from one or more wireless communication devices of the group;
    merging the received respective lists into a composite list of other base stations available for serving the one or more wireless communication devices of the group;
    estimating a location of the base station based on a centroid of the locations of the base stations in the composite list;
    the base station adopting the centroid as a determined location of the base station; and
    the base station using the determined location in a request for authorization to operate in the wireless communication system.

2. The method of claim 1, wherein the base station includes a satellite-based positioning system receiver,
    and wherein initiating the wireless data communications is responsive to the base station attempting and failing to acquire a satellite-based positioning system fix with the satellite-based positioning system receiver.

3. The method of claim 2, wherein the base station attempting and failing to acquire a satellite-based positioning system fix with the satellite-based positioning system receiver comprises the base station failing to acquire a satellite-based positioning system fix within a predetermined amount of time.

4. The method of claim 1, wherein the wireless communication system comprises one or more macro base stations and one or more micro base stations,
    and wherein the base station is micro base station.

5. The method of claim 1, wherein each respective list of other base stations available for serving the respective wireless communication device includes information indicating an identity for each base station in the list,
    and wherein estimating the location of the base station based on the centroid of the locations of the base stations in the composite list comprises:
    determining respective locations for a plurality of base stations in the composite list; and
    determining a centroid location based on the respective locations for the plurality.

6. The method of claim 5, wherein the base station and the base stations in the composite list are communicatively connected by a backhaul network of the wireless communication system,
    and wherein determining the respective locations for the plurality of base stations in the composite list comprises:
    sending a location request to each respective base station of the plurality of base stations via the backhaul network; and
    receiving a respective response from each of the plurality of base stations via the backhaul network, each respective response including information indicating a location of the respective base station.

7. The method of claim 5, wherein determining the respective locations for the plurality of base stations in the composite list comprises:
    sending information indicating the identity for each base station in the composite list to a server device in the wireless communication system; and
    receiving from the server device a response including information indicating a location of each of the plurality of base stations in the composite list.

8. The method of claim 1, wherein each respective list of other base stations available for serving the respective wireless communication device includes information indicating an identity for each base station in the list,
    and wherein estimating the location of the base station based on the centroid of the locations of the base stations in the composite list comprises:
    sending information indicating the identity for each base station in the composite list to a server device in the wireless communication system; and
    receiving from the server device a response including a centroid location of a plurality of base stations in the composite list.

9. The method of claim 1, wherein the wireless communication system is configured to operate according to at least one of Long Term Evolution (LTE), 1X Radio Transmission Technology (1X-RTT), or Evolution-Data Optimized (EVDO),
    and wherein the respective list of other base stations available for serving the respective wireless communication device is a neighbor list of available wireless coverage areas, each of the wireless coverage areas being a cell or a sector.

10. A base station configured for operating in a wireless communication system, the base station comprising:
    one or more processors;
    memory accessible by the one or more processors; and
    machine-readable instructions stored in the memory, that upon execution by the one or more processors cause the base station to carry out functions including:
    initiating wireless data communications with each of a group of wireless communication devices within a coverage area of the base station,
    subsequent to initiating the wireless data communications, transmitting a request to each respective wireless communication device of the group for a respective list of other base stations available for serving the respective wireless communication device,
    in response to the request, receiving respective lists from one or more wireless communication devices of the group,
    merging the received respective lists into a composite list of other base stations available for serving the one or more wireless communication devices of the group, and estimating a location of the base station based on a centroid of the locations of the base stations in the composite list;

the base station adopting the centroid as a determined location of the base station; and the base station using the determined location in a request for authorization to operate in the wireless communication system.

11. The base station of claim 10, further comprising a satellite-based positioning system receiver, and wherein initiating the wireless data communications is responsive to the base station attempting and failing to acquire a satellite-based positioning system fix with the satellite-based positioning system receiver.

12. The base station of claim 10, wherein the wireless communication system comprises one or more macro base stations and one or more micro base stations, and wherein the base station is micro base station.

13. The base station of claim 10, wherein each respective list of other base stations available for serving the respective wireless communication device includes information indicating an identity for each base station in the list, and wherein estimating the location of the base station based on the centroid of the locations of the base stations in the composite list comprises:

determining respective locations for a plurality of base stations in the composite list; and determining a centroid location based on the respective locations for the plurality.

14. The base station of claim 13, wherein the base station and the base stations in the composite list are communicatively connected by a backhaul network of the wireless communication system, and wherein determining the respective locations for the plurality of base stations in the composite list comprises:

sending a location request to each respective base station of the plurality of base stations via the backhaul network; and receiving a respective response from each of the plurality of base stations via the backhaul network, each respective response including information indicating a location of the respective base station.

15. The base station of claim 10, wherein the wireless communication system is configured to operate according to at least one of Long Term Evolution (LTE), 1X Radio Transmission Technology (1X-RTT), or Evolution-Data Optimized (EVDO), and wherein the respective list of other base stations available for serving the respective wireless communication device is a neighbor list of available wireless coverage areas, each of the wireless coverage areas being a cell or a sector.

16. A non-transitory computer-readable medium having instructions stored thereon that, upon execution by one or more processors of a base station, cause the base station to carry out functions including:

initiating wireless data communications with each of a group of wireless communication devices within a coverage area of the base station;

subsequent to initiating the wireless data communications, transmitting a request to each respective wireless communication device of the group for a respective list of other base stations available for serving the respective wireless communication device;

in response to the request, receiving respective lists from one or more wireless communication devices of the group;

merging the received respective lists into a composite list of other base stations available for serving the one or more wireless communication devices of the group; and estimating a location of the base station based on a centroid of the locations of the base stations in the composite list;

the base station adopting the centroid as a determined location of the base station; and the base station using the determined location in a request for authorization to operate in the wireless communication system.

17. The non-transitory computer-readable medium of claim 16, further comprising a satellite-based positioning system receiver, and wherein initiating the wireless data communications is responsive to the base station attempting and failing to acquire a satellite-based positioning system fix with the satellite-based positioning system receiver.

18. The non-transitory computer-readable medium of claim 16, wherein each respective list of other base stations available for serving the respective wireless communication device includes information indicating an identity for each base station in the list, and wherein estimating the location of the base station based on the centroid of the locations of the base stations in the composite list comprises:

determining respective locations for a plurality of base stations in the composite list; and determining a centroid location based on the respective locations for the plurality.

19. The non-transitory computer-readable medium of claim 18, wherein the base station and the base stations in the composite list are communicatively connected by a backhaul network of the wireless communication system, and wherein determining the respective locations for the plurality of base stations in the composite list comprises:

sending a location request to each respective base station of the plurality of base stations via the backhaul network; and receiving a respective response from each of the plurality of base stations via the backhaul network, each respective response including information indicating a location of the respective base station.

20. The non-transitory computer-readable medium of claim 16, wherein the wireless communication system is configured to operate according to at least one of Long Term Evolution (LTE), 1X Radio Transmission Technology (1X-RTT), or Evolution-Data Optimized (EVDO), and wherein the respective list of other base stations available for serving the respective wireless communication device is a neighbor list of available wireless coverage areas, each of the wireless coverage areas being a cell or a sector.

* * * * *